(12) United States Patent
Vanhooydonck

(10) Patent No.: US 6,702,416 B2
(45) Date of Patent: Mar. 9, 2004

(54) METHODS AND APPARATUS FOR PRINTING GREY LEVELS

(75) Inventor: Rudi Vanhooydonck, Zwijndrecht (BE)

(73) Assignee: AGFA-Gevaert, Mortsel (BE)

( * ) Notice: Subject to any disclaimer, the term of this patent is extended or adjusted under 35 U.S.C. 154(b) by 0 days.

(21) Appl. No.: 10/283,537

(22) Filed: Oct. 30, 2002

(65) Prior Publication Data
US 2003/0103093 A1 Jun. 5, 2003

Related U.S. Application Data

(60) Provisional application No. 60/350,114, filed on Jan. 17, 2002.

(30) Foreign Application Priority Data
Dec. 5, 2001 (EP) .............................................. 01000713

(51) Int. Cl.[7] .............................. B41J 2/205; B41J 2/21
(52) U.S. Cl. ........................................... 347/15; 347/43
(58) Field of Search ............................. 347/15, 43, 19, 347/14

(56) References Cited

U.S. PATENT DOCUMENTS

| 4,959,659 A | 9/1990 | Sasaki et al. .................. 347/43 |
| 5,485,183 A | * 1/1996 | Zandian et al. ................ 347/41 |
| 5,625,397 A | 4/1997 | Allred et al. ................. 347/100 |
| 6,254,217 B1 | * 7/2001 | Askeland et al. ............. 347/43 |

FOREIGN PATENT DOCUMENTS

| EP | 0 911 175 A2 | 4/1999 |
| EP | 0 941 858 A1 | 9/1999 |
| EP | 01 00 0713 | 5/2002 |
| WO | WO 91/04864 | 4/1991 |

* cited by examiner

Primary Examiner—Thinh Nguyen
(74) Attorney, Agent, or Firm—John A. Merecki; Hoffman, Warnick & D'Alessandro

(57) ABSTRACT

Printing media, a method and an apparatus for printing an image on a print medium are provided, the image having super-pixels made up of a combination of dots, wherein each of the dots is independently controlled with respect to the size of each dot, the density of each dot, and an overlap of at least two of the dots.

18 Claims, 5 Drawing Sheets

| 1 2 | ~2 | 1 4 | ~2 | 1 4 | ~2 |
| 3 4 | | 2 3 | | 3 2 | |
| 1 3 | ~2 | 1 2 | ~2 | 1 3 | ~2 |
| 2 4 | | 4 3 | | 4 2 | |
| 2 1 | ~2 | 2 3 | ~2 | 2 4 | ~2 |
| 4 3 | | 1 4 | | 3 1 | |
| 2 4 | ~2 | 2 1 | ~2 | 2 3 | ~2 |
| 1 3 | | 3 4 | | 4 1 | |
| 3 1 | ~2 | 3 4 | ~2 | 3 1 | ~2 |
| 4 2 | | 2 1 | | 2 4 | |
| 3 4 | ~2 | 3 2 | ~2 | 3 2 | ~2 |
| 1 2 | | 4 1 | | 1 4 | |
| 4 3 | ~2 | 4 3 | ~2 | 4 2 | ~2 |
| 2 1 | | 1 2 | | 1 3 | |
| 4 2 | ~2 | 4 1 | ~2 | 4 1 | ~2 |
| 3 1 | | 3 2 | | 2 3 | |

METHODS AND APPARATUS FOR PRINTING GREY LEVELS

This application claims the benefit of provisional application No. 60/350,114, filed Jan. 17, 2002.

FIELD OF THE INVENTION

The present invention relates to ink jet printing, and more particularly to printed media, a method of printing and an apparatus for providing images having grey levels of varying intensity, especially for printing on transparencies used to produce high quality medical images such as X-ray, ultrasound, nuclear medicine, magnetic resonance, computed tomography, positron emission tomography, and angiography. With grey levels is meant black/white and/or colour levels of varying intensity.

BACKGROUND OF THE INVENTION

In medical imaging, it is necessary to print images with a resolution of at least 300 dpi and to have 256 distinguishable grey levels, in order to be able to see enough details in the medical image.

In general, three methods exist to achieve a grey level in an image: area modulated printing, density modulated printing or combined area and density modulated printing.

In area modulated printing, grey levels are achieved by printing on certain places of a printing medium, and not printing on others. Ink with an infinite density is used. Light falling in on the medium passes through areas where nothing is printed, and is absorbed completely by the ink on the printed areas. Different methods are possible to print an image in this way: using one pixel with different dot-sizes, using different pixels with one dot-size or using different pixels with different dot-sizes.

U.S. Pat. No. 6,102,513 describes a method and apparatus for printing an output image on a receiver medium in response to an input image file defined by a plurality of pixels. Each pixel obtains a pixel value. The apparatus includes a print head with a plurality of nozzles. Each of the nozzles is capable of ejecting a plurality of ink droplets therefrom. The centres of ink droplets of different volumes are placed at the centre of a pixel on the receiver. In this way, ink spots of different diameters or sizes are symmetrically placed within pixels on the receiver.

It is very difficult to use an area-modulated printing method to obtain 256 grey levels on 300 dpi in a transparent image, because the printed dots need to be very small (smaller than 10 $\mu$m) in order to come below the Kanamori curve, which is a curve taking into account the non-linearity of the sensitivity of the human eye. If a plane with a first density lies within a plane with a second density, and the density difference between both lies under the Kanamori curve, then the plane with the first density is indistinguishable from the plane with the second density. Furthermore, the dots have to be placed very accurately. If it is desired to have a density of 3 with an infinite ink, an area of $1/1000^{th}$ of the pixel should not be covered, as the relationship between density and transparency is given by $T=10^{-D}$, D being the density and T being the transparency. This means that the droplets have to be placed with an accuracy of $$\sqrt{\frac{1}{1000}}$$

of the resolution. This is 2.7 $\mu$m for 300 dpi. If the accuracy is less (the distance between two dots is more than 2.7 $\mu$m for a 300 dpi image), stripes wil become visible.

A second method to obtain a grey image is density modulated printing, in which grey levels are achieved by printing dots of the same size, but with a different ink density. A different ink density is obtained by reducing the transparency of the ink for certain dots. Light passes more or less through the ink, depending on the density or the colour of the ink. Because it is impossible to have 256 heads each printing a different ink, the ink has to be mixed during printing. This can be done either before jetting, such as described e.g. in U.S. Pat. No. 5,606,351 or in U.S. Pat. No. 6,097,406, or on the medium.

In U.S. Pat. No. 6,042,209, continuous tone pixels are produced on a receiver by controlling the amount of ink delivered to the receiver in order to control the optical density of the pixels. All image pixels have equal areas on the receiver, regardless of the volumes of ink deposited. When a low optical density is desired, little ink is delivered; and when a high optical density is desired, more ink is delivered.

In U.S. Pat. No. 5,625,397, plural inks of the same dye, having different densities, are used in a dot-on-dot printing format. That way, a desired optical density level may be readily achieved.

In combined area and density modulated printing, the methods of both are combined.

WO 91/04864 describes a method to improve the printing quality of half-tone originals by means of printers of the type in which a number of dots are brought together in a cell. Each dot in the cell is controlled individually with respect to its size and/or its colour value. The above method has the disadvantage that not enough grey levels can be obtained for printing e.g. medical images.

SUMMARY OF THE INVENTION

It is an object of the present invention to provide a plurality of grey scale levels, preferably at least 256, the densities of which are equally spread over the total density range so as to meet the Kanamori curve, i.e. so as to provide a quantisation of the density values wherein increments between a first and a second density value corresponding with successive grey scale values correspond with the minimum perceptible density difference.

It is an object of the present invention to provide printer and a printing method capable of printing a plurality of grey scale levels, preferably at least 256, the densities of which are equally spread over the total density range so as to meet the Kanamori curve, i.e. so as to provide a quantisation of the density values wherein increments between a first and a second density value corresponding with successive grey scale values correspond with the minimum perceptible density difference.

It is an object of the present invention to provide printed media having printing with a plurality of grey scale levels, preferably at least 256, the densities of which are equally spread over the total density range so as to meet the Kanamori curve, i.e. so as to provide a quantisation of the density values wherein increments between a first and a second density value corresponding with successive grey scale values correspond with the minimum perceptible density difference.

The present invention provides a method of printing an image having super-pixels made of a combination of dots on a print medium, wherein each of the dots is independently controlled with respect to the size of each dot, the density of each dot, and an at least part overlap of at least two of the dots.

According to a preferred embodiment, at least two inks with different grey levels may be used.

The present invention also provides a method of selecting a plurality of grey scale levels of super-pixels made of a combination of dots on a print medium, the grey levels being determined by the size of each dot, the density of each dot and an overlap of at least two of the dots, wherein the selection is based on the Kanamori curve. Preferably the plurality of grey scale levels contains 256 grey scale levels. The selection may furthermore be based on stability. By stability is meant the resistance of each grey scale value to printing errors, e.g. the resistance of the density to the errors in the accuracy of placing each dot which makes up a super-pixel or of the control of the size of each dot or density of dot.

All methods of the present invention may be used for providing and selecting grey scale levels for printing medical images.

The present invention also provides an apparatus for printing an image having super-pixels, each super-pixel comprising a combination of dots to be printed on a print medium, the apparatus comprising means for independently controlling dots within a super-pixel with respect to:

1) a size of each dot,
2) a density of each dot, and
3) an at least part overlap of at least two of the dots.

The present invention also provides a printing medium comprising printed data, the printed data being represented by a plurality of super-pixels, each super-pixel comprising a plurality of printed dots, at least one printed super-pixel comprising two dot of different sizes, two dots of different densities and two dots which overlap each other partly. The present invention includes that a super-pixel has two dots having different sizes, different densities and overlapping each other at least partially. The printing media could be transparent, semi-transparent or opaque. The printing medium may be used for printing a medical image.

The present invention also includes a computer program product for executing any of the methods of the present invention when executed on a computing device associated with a printing head. The present invention also includes a machine readable data storage device storing the computer program product.

The present invention will now be described with reference to the following drawings.

BRIEF DESCRIPTION OF THE DRAWINGS

FIG. 6b shows an enlarged middle square of FIG. 6a.

DETAILED DESCRIPTION OF THE INVENTION

Figure 1:
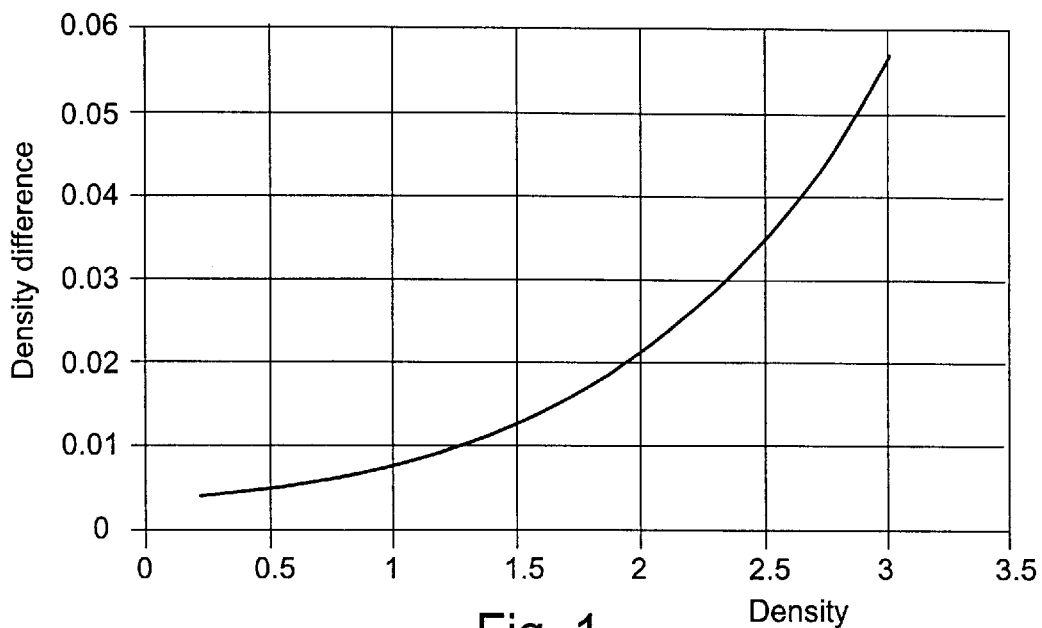
FIG. 1 shows a Kanamori curve, giving density differences that are distinguishable with a human eye, in function of densities.

Although the present invention will be described with reference to certain embodiments and drawings the present invention is not limited thereto but only by the claims. The present invention will be described with reference mainly to ink-jet printing but the present invention is not limited thereto. The term "printing" as used in this invention should be construed broadly. It relates to forming markings whether by ink or other materials or methods onto a printing substrate. Various printing methods which may be used with the present invention are described in the book "Principles of non-impact printing", J. L. Johnson, Palatino Press, Irvine, 1998, e.g. thermal transfer printing, thermal dye transfer printing, deflected ink jet printing, ion projection printing, field control printing, impulse ink jet printing, drop-on-demand ink jet printing, continuous ink jet printing. Non-contact printing methods are particularly preferred. However, the present invention is not limited thereto. Any form of printing including dots or droplets on a substrate is included within the scope of the present invention, e.g. piezoelectric printing heads may be used to print polymer materials as used and described by Plastic Logic (http://plasticlogic.com/) for the printing of thin film transistors. Hence, the term "printing" in accordance with the present invention not only includes marking with conventional staining inks but also the formation of printed structures or areas of different characteristics on a substrate. On example is the printing of water repellent or water attractive regions on a substrate in order to form an off-set printing plate by printing. Accordingly, the term "printing medium" or "printing substrate" should also be given a wide meaning including not only paper, transparent sheets, textiles but also flat plates or curved plates which may be included in or be part of a printing press. In addition the printing may be carried out at room temperature or at elevated temperature, e.g. to print a hot-melt adhesive the printing head may be heated above the melting temperature. Accordingly, the term "ink" should also be interpreted broadly including not only conventional inks but also solid materials such as polymers which may be printed in solution or by lowering their viscosity at high temperatures as well as materials which provide some characteristic to a printed substrate such as information defined by a structure on the surface of the printing substrate, water repellence, or binding molecules such as DNA which are spotted onto microarrays. As solvents both water and organic solvents may be used. Inks as used with the present invention may include a variety of additives such as ant-oxidants, pigments and cross-linking agents.

According to an embodiment of the present invention, each pixel of an e.g. 300 dpi image is divided in a 2×2-matrix. A pixel consisting of such a 2×2-matrix is therefore called a super-pixel. It is an object of the present invention to create 256 grey levels which meet the Kanamori curve.

The Kanamori curve gives a relation between density differences and density, which density difference is distinguishable by the human eye at that density. For each density, a minimum density difference is necessary in order to be distinguishable. The Kanamori curve is as shown in FIG. 1. Series of curves are developed that indicate for particular environmental circumstances the minimum density difference within a given surrounding density that can still be detected by the human eye. In the example of FIG. 1, the curve begins at density 0.23, the intrinsic density of the film the image is printed on, due to fog of the film. Image densities lower than the intrinsic density of the film will not be seen by the human vision system. It can be seen that, for densities in the lower part of the curve, lower density differences are more easily seen than for densities in the upper part of the curve. For example, for density 1, in order to be distinguishable, the density difference must be at least about 0.008, while for density 2, the density difference must be at least about 0.022. Therefore, for lower densities more grey levels are necessary than for higher densities in order to have unnoticeable grey level transitions.

Each 2×2-matrix super-pixel of the embodiment of the present invention comprises four cells, which each can comprise a dot. If a 300 dpi image is to be printed, each cell has a resolution of 600 dpi.

Each of the four dots which together form the super-pixel, has a set of parameters which can be changed:

1) the size of the droplet: e.g. a certain number of selectable levels are provided, such as 8 levels for instance, whereby the size of the droplet can be larger than the size of a cell—choice of the size of the droplet can therefore also fix overlap of neighbouring droplets,
2) the density of the droplet: density depends on the ink used, e.g. a selectable number of inks may be provided, three different inks may be used, for instance.

In accordance with embodiments of the present invention these parameters can be changed independently and a lot of combinations are possible.

If L is the number of levels of droplet sizes, and P is the number of pixels in a super-pixel, the number of different combinations if one single ink is used in a super-pixel, can be calculated as follows:

$$\binom{P+L-1}{P} = \frac{(P+L-1)!}{P!(L-1)!} \qquad (\text{eq. 1})$$

For the example given of 4 pixels in one super-pixel, and 8 levels for the size of each of the droplets, 330 combinations are possible.

Figure 2:
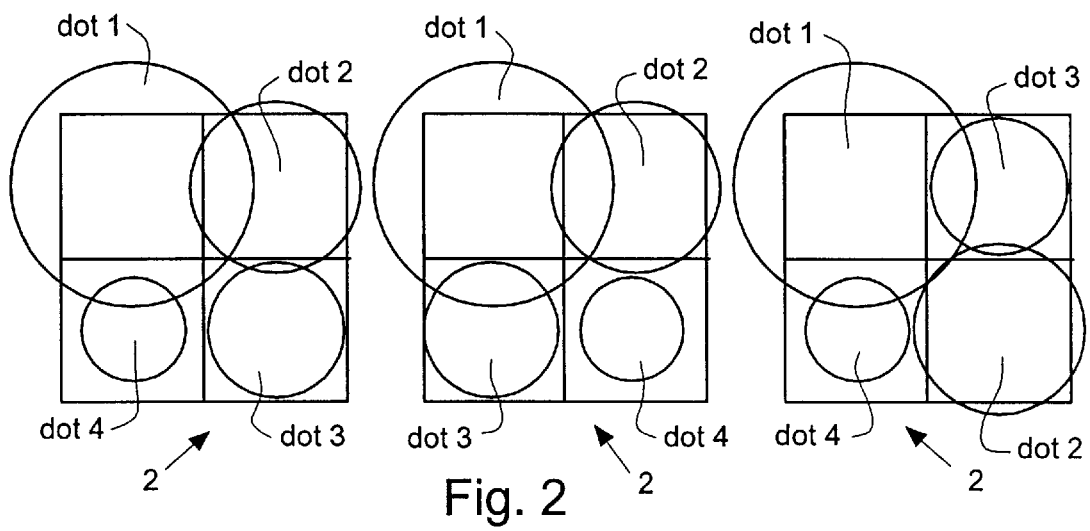
FIG. 2 shows that different combinations of dots in a super-pixel lead to different densities; the same dot sizes are used in the different possibilities shown in FIG. 2.
Figures 3, 4:
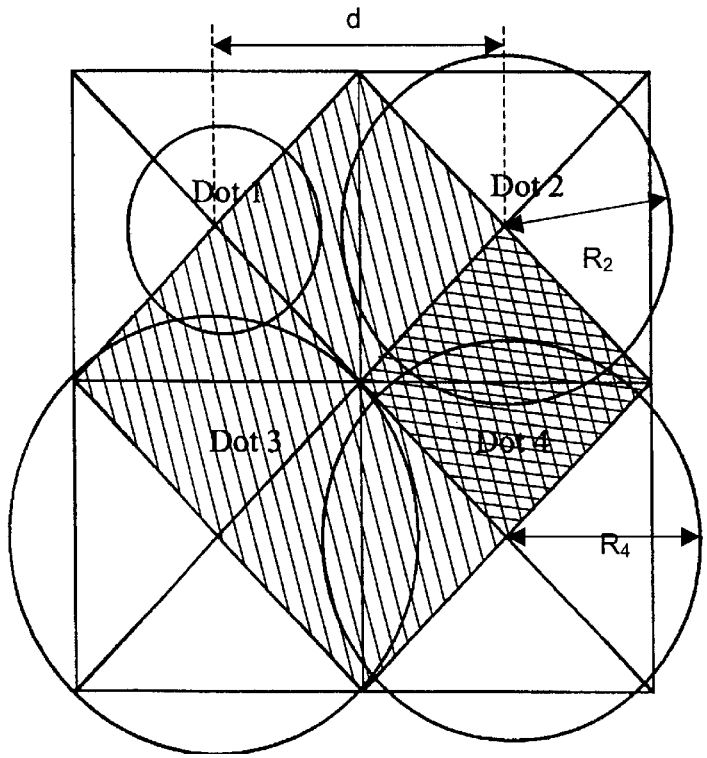
FIG. 3 schematically shows some combinations of dots having a same density, and other combinations of the same dots having a different density.
FIG. 4 illustrates a 2×2-matrix super-pixel with four overlapping dots of different dot sizes.

As eq. 1 counts each combination with the same dot-sizes once, other combinations with the same dot size, but which produce a different density, have to be added to this result. In FIG. 2, a super-pixel 2 with three combinations of dots dot 1, dot 2, dot 3, dot 4, with the same dot sizes in each of the combinations are depicted. The different combinations do result, however, in different densities due to differences in overlap of the dots dot 1, dot 2, dot 3, dot 4. For each combination of four dots dot 1, dot 2, dot 3, dot 4, maximum two other combinations can be found which lead to a different density. This is shown in FIG. 3, wherein the different numbers within one super-pixel 2 correspond to a certain dot size. There are 24 possibilities for placing four dot sizes in four cells making up a 2×2-matrix super-pixel 2, which combinations are all shown in FIG. 3. In all combinations in the first column, a dot with size 1 is placed on one side next to a dot with size 2, and on another side next to a dot with size 3. This means that the dots with size 2 and 3 are both adjacent to a dot with size 4 in all combinations in the first column of FIG. 3. Therefore, all combinations in the first column have the same overlaps between dot 1 and dot 2, dot 1 and dot 3, dot 2 and dot 4, dot 3 and dot 4 respectively, and thus the same density. The same holds for all combinations in the second column, where a dot with size 1 is placed next to both a dot with size four and a dot with size 2; and for all combinations in the third column, where a dot with size 1 is placed next to both a dot with size 3 and a dot with size 4.

The difference between the combinations on any row of FIG. 3, is as shown in FIG. 2: combinations of dots with different overlaps lead to different densities for the super-pixel.

The total number of possible combinations appears to be, with P the number of pixels in a super-pixel and L the number of levels of droplet sizes:

$$X \frac{(P+L-1)!}{P!(L-1)!} \qquad (\text{eq. 2})$$

with X a factor dependent on the number of pixels in the super-pixel and on the location of the pixels in the super-pixel, or thus the shape of the super-pixel. For example for a super-pixel comprising four pixels placed in a square, as shown in FIGS. 2 and 3, the factor X equals 3.

In special cases, however, such as e.g. when 3 dots with the same size are used, and only 1 dot with another size, the combinations on one row yield the same density result. Therefore, the total number of possible combinations is not given by eq. 2, but is smaller. For example for four pixels and eight levels, the total number of different combinations is less than 330*3=990. After filtering identical combinations, 778 different combinations are left for one ink.

In order to calculate the density of a super-pixel, each of the overlapping areas of the dots in the cells has to be calculated. This has to be done for each of the possible combinations, thus for each of the 778 combinations of the example given above.

In the model worked out below, the maximum dot size has a diameter of twice the pixel distance d. The pixel distance d is the distance between the centres of two neighbouring pixels, as can be seen in FIG. 4. If a maximum dot size with a diameter larger than twice the pixel distance d can be used as well, another model has to be built, because in that case more neighbours influence the overlap areas.

The areas covered with ink, corresponding to densities for the super-pixel, can be calculated. In FIG. 4 is shown a 2×2-matrix super-pixel, with four different dots dot 1, dot 2, dot 3, dot 4 printed. If the super-pixels have a resolution of 300 dpi, the resolution of the cells that make up the super-pixels is 600 dpi. When assuming ink with an infinite density being used, the maximum density is reached when a coverage of 100% is reached. For a 600 dpi image, the distance d between two dots is 25400 $\mu$m/600=42.33 $\mu$m. The diameter of the biggest dot to obtain 100% coverage is then $$2*42.33\ \mu\text{m} = 84.66\ \mu\text{m}.$$

For example, the area on which ink is put, in the double hatched square between dot 2 and dot 4, can be calculated as follows. The covered area is given by a quarter of the circle formed by dot 2 plus a quarter of the circle formed by dot 4 minus the mutual part between dot 2 and dot 4 (because this mutual part has been counted twice). If the radius of dot 2 and dot 4 are given by $R_2$ and $R_4$ respectively, the area of a quarter of the circle formed by dot 2 is given by:

$$\text{Sec}_1 = \frac{\pi R_2^2}{4} \qquad \text{(eq. 3)}$$

and the area of a quarter of the circle formed by dot 4 is given by:

$$\text{Sec}_2 = \frac{\pi R_4^2}{4} \qquad \text{(eq. 4)}$$

Figure 5:
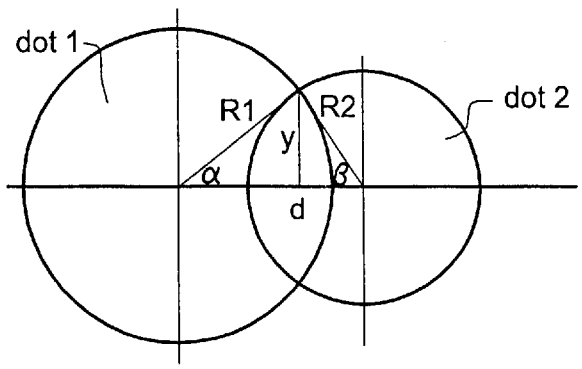
FIG. 5 shows two partially overlapping dots for calculation purposes.

The mutual part between dot 2 and dot 4 can be calculated when considering FIG. 5. The distance between two dots, dot 1, dot 2, is given by the raster resolution d. $R_1$ is the radius of dot 1, and $R_2$ is the radius of dot 2. The area $S_1$ of the sector formed by angle $2\alpha$ in dot 1 is given by $S_1 = \alpha R_1^2$. The area $S_2$ of the sector formed by angle $2\beta$ in dot 2 is given by $S_2 = \beta R_2^2$. Further it is possible to calculate the area of the triangle formed by the angle $\alpha$, the side $R_1$ and the side y:

$$T_1 = \frac{R_1 \cos\alpha \cdot R_1 \sin\alpha}{2} \qquad \text{(eq. 5)}$$

Equally, the area of the triangle formed by the angle $\beta$, the side $R_2$ and the side y is given by:

$$T_2 = \frac{R_2 \cos\beta \cdot R_2 \sin\beta}{2} \qquad \text{(eq. 6)}$$

The area of the common segments between dot 1 and dot 2 is obtained by subtracting the areas of the triangles given by $2\alpha$, $R_1$, 2y and by $2\beta$, $R_2$, 2y from the areas $S_1$, $S_2$ of the sectors:

$$C_{12} = S_1 - 2 \cdot T_1 + S_2 - 2 \cdot T_2 \qquad \text{(eq. 7)}$$

To calculate $\alpha$ and $\beta$, the cosine-rule is used:

$$R_1^2 = R_2^2 + d^2 - 2R_2 d \cos\beta \qquad \text{(eq. 8)}$$

$$R_2^2 = R_1^2 + d^2 - 2R_1 d \cos\alpha \qquad \text{(eq. 9)}$$

This leads to:

$$\alpha = \arccos\left(\frac{R_1^2 + d^2 - R_2^2}{2R_1 d}\right) \qquad \text{(eq. 10)}$$

$$\beta = \arccos\left(\frac{R_2^2 + d^2 - R_1^2}{2R_2 d}\right) \qquad \text{(eq. 11)}$$

In this way, the ink-coverage (IC) in one double hatched square of FIG. 4 can be calculated:

$$IC = Sec_1 + Sec_2 - C_{12} \qquad \text{(eq. 12)}$$

or thus:

$$IC = Sec_1 + Sec_2 - S_1 - S_2 + 2T_1 + 2T_2 \qquad \text{(eq. 13)}$$

For each of the hatched squares in FIG. 4, the ink-coverage IC can be calculated by means of eq. 13. The calculated ink-coverages are to be added to obtain the total ink-coverage in the hatched squares. If every combination is taken twice (as the super-pixels repeat next to each other in all directions; the grey levels being the same for pixels located next to each other), the size of the ink covered area of the four pixels is known:

$$A_{ink\_4\ pixel} = (IC12 + IC13 + IC24 + IC34) * 2 \qquad \text{(eq. 14)}$$

The transparency T can be calculated by dividing this area by the total area of the super-pixel:

$$T = A_{ink\_4\ pixel} / 4d^2 \qquad \text{(eq. 15)}$$

The achieved density for the super-pixel can be calculated from eq. 14 and eq. 15 by the following formula:

$$D = -\log(T) \qquad \text{(eq. 16)}$$

In the above, only one ink with infinite density has been used. If however, a number of inks of different densities are used, then for each combination, each dot can be printed with ink of a different density. When n inks are used, and only one dot size level, the total number of possible combinations is $n^P$, with P the number of pixels in the super-pixel, because each pixel can be printed with each of the inks. The total number of different combinations that can be achieved with for example three inks in a 2×2-matrix super-pixel, is then $3^4 = 81$.

According to the present invention, the use of different inks can be combined with the use of different dot sizes, whereby dots can overlap. For example, for three inks, four pixels (=2×2-matrix super-pixel) and eight dot size levels, there are theoretically 81*778=63018 combinations. In reality, there will be less combinations, because some of them have the same density. The real number of possible combinations for the example given amounts to 39258.

Out of these 39258 combinations with a different density, it is possible to choose 256 combinations leading to grey levels that meet certain pre-set conditions, such as for example stability. By stability is meant the resistance of each grey scale value to printing errors, e.g. the resistance of the density to the errors in the accuracy of placing each dot which makes up a super-pixel or of the control of the size of each dot or density of dot.

The density $D_{12}$ of an overlapping area between a first dot with density $D_1$ and a second dot with density $D_2$ can be calculated as follows:

$$D_{12} = D_1 + D_2 \qquad \text{(eq. 17)}$$

or, in function of transparency, whereby the transparency T is given in function of the density D as $T = 10^{-D}$:

$$T_{12} = T_1 * T_2 \qquad \text{(eq. 18)}$$

Figure 6A:
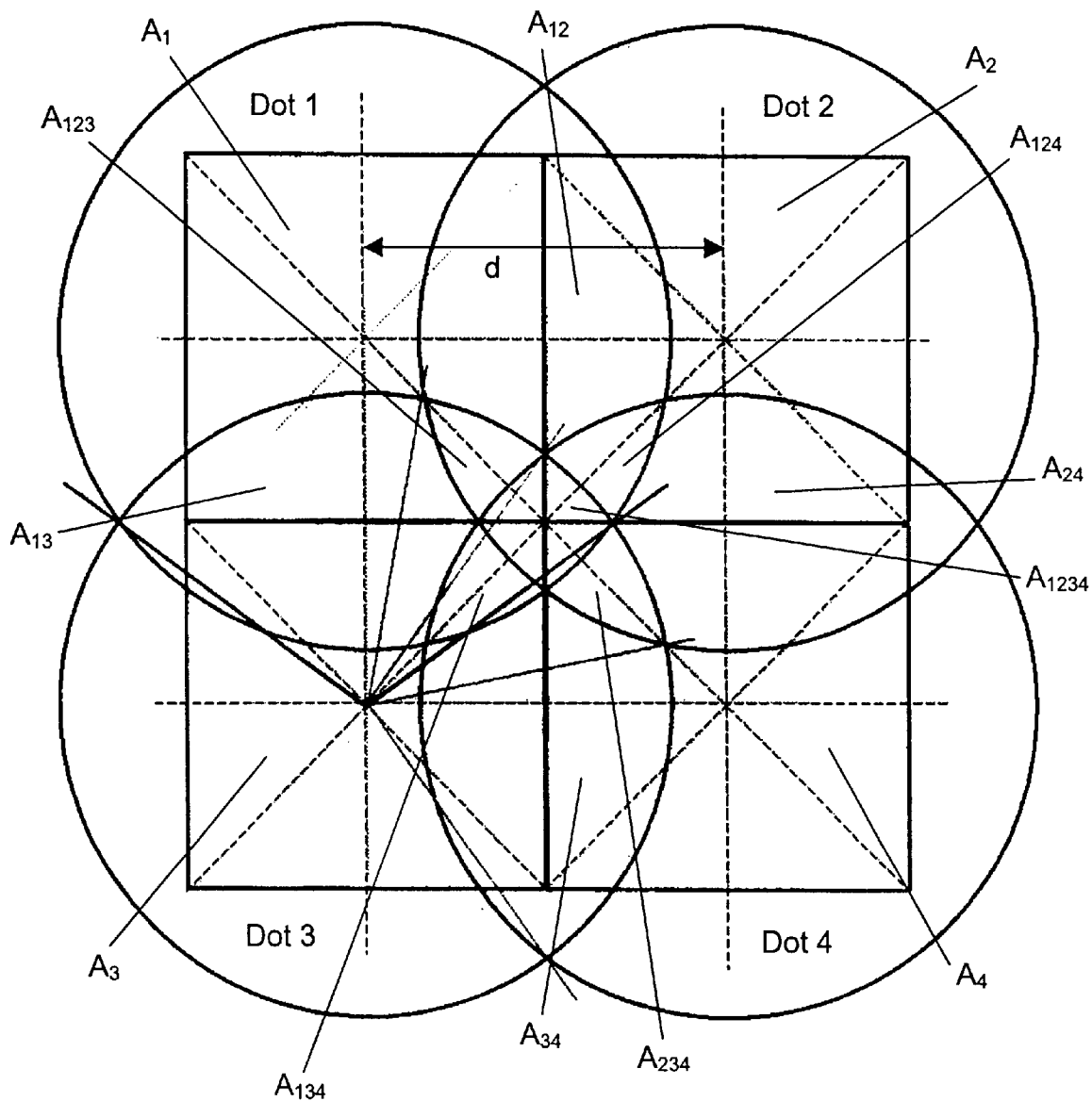
FIG. 6a illustrates a 2×2-matrix super-pixel with four overlapping dots of same dot sizes.

Calculating the resulting density of the super-pixel represented in FIG. 6a, whereby each dot may have a different density, may for example be done as described hereinafter. In this method, the area of each surface in FIG. 6b, which presents an enlarged version of the middle square in FIG. 6a, is calculated. Formulae for calculating each of the surfaces are not given hereinafter, as they are clear for a person skilled in the art.

Figure 6B:
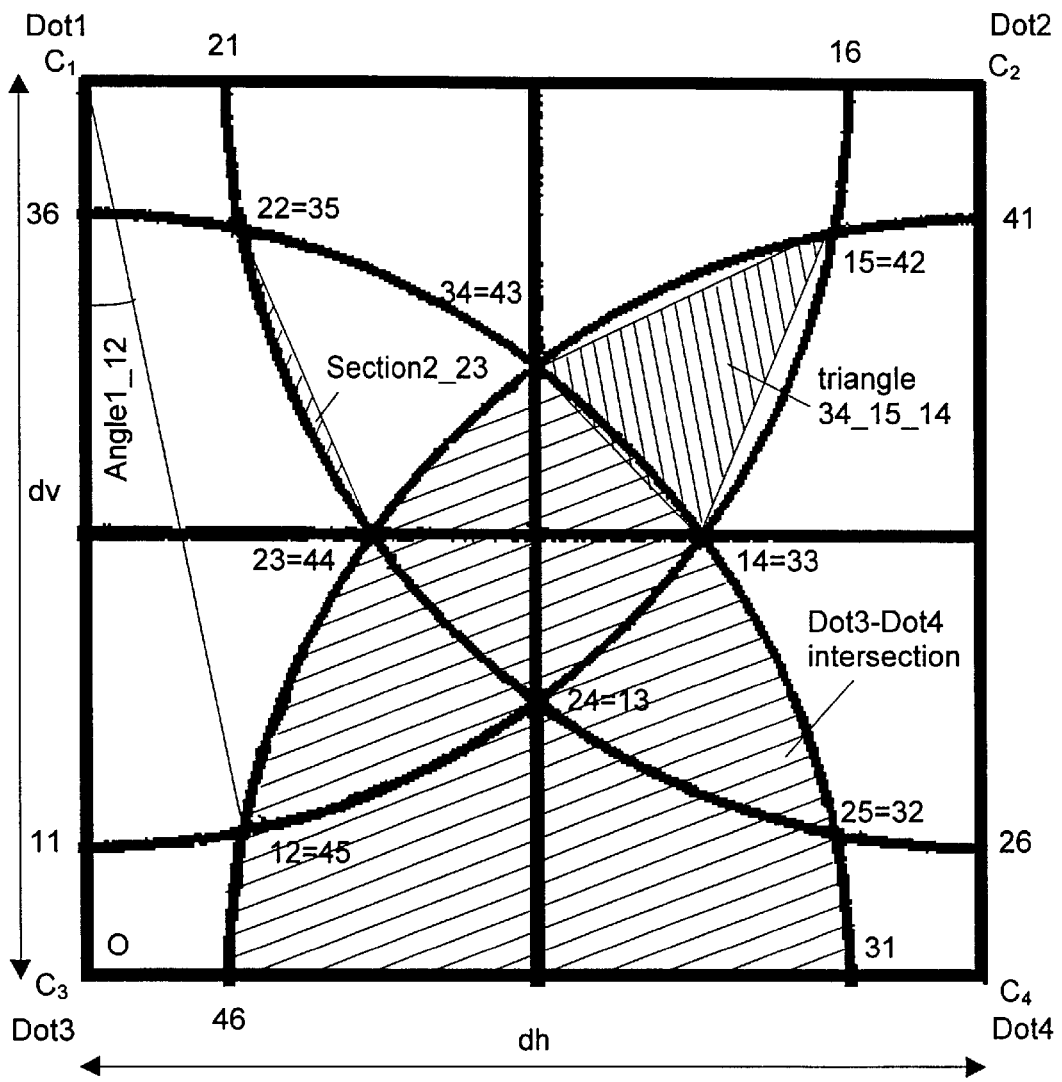

In the middle square of FIG. 6a, each point of intersection of one dot with another, and each point of intersection of a dot with the square, is numbered by means of a two-digit number ij, e.g. 11, 12, . . . , 16, 21, . . . , 26, 31, . . . , 36, 41, . . . , 46, as shown in the enlarged FIG. 6b, wherein the first digit i indicates to which dot the intersection point belongs, and wherein the second digit j indicates a serial number. For each set of two subsequent points of intersection of a dot i, the angle between both points $ij_1$, $ij_2$ with regard to the centre point ci of the respective dot i is calculated, e.g. for dot 1, angle1__12 is calculated, which is the angle, seen from the centre point c1 of dot 1, between the points 11 and 12 (called in general anglei__$j_1j_2$.

An origin O is chosen for example in the centre point c3 of dot 3, as shown in FIG. 6b, and co-ordinates of each of the points of intersection are calculated, thereby using the calculated angles anglei__$j_1j_2$, the distance dh in horizontal direction between the centres of two neighbouring dots, and the distance dv in vertical direction between the centres of two neighbouring dots. In the example given in FIGS. 6a and 6b, dh and dv are equal, but in general they may be different.

For each dot i, using the calculated angles anglei__$j_1j_2$, the surfaces of the segments are calculated, such as e.g. sectioni-$j_1j_2$ represented in FIG. 6b as section2__23.

Intersections between different dots dot $i_1$, dot $i_2$ are calculated, such as e.g. dot3-dot4 intersection shown in FIG. 6b, using the calculated angles anglei__$j_1j_2$ and the rays of the dots.

Areas of different triangles are calculated, such as triangle__34__15__14, which in combination with the respective calculated segments (to be added or subtracted) give the area of the respective surfaces.

Because the area of each part of the super-pixel covered with ink with a certain density is known (can be calculated), the total density of the super-pixel can be calculated as well, for example for the super-pixel in FIG. 6a:

$$D = -\log \left( \frac{\begin{array}{l} A_1T_1 + A_2T_2 + A_3T_3 + A_4T_4 + A_{12}T_{12} + A_{13}T_{13} + \\ A_{14}T_{14} + A_{23}T_{23} + A_{24}T_{24} + A_{34}T_{34} + A_{123}T_{123} + \\ A_{124}T_{124} + A_{134}T_{134} + A_{234}T_{234} + A_{1234}T_{1234} \end{array}}{\begin{array}{l} A_1 + A_2 + A_3 + A_4 + A_{12} + A_{13} + A_{14} + A_{23} + \\ A_{24} + A_{34} + A_{123} + A_{124} + A_{134} + A_{234} + A_{1234} + A_{empty} \end{array}} \right) \quad \text{(eq. 19)}$$

$A_i$ is the area of the super-pixel covered with a single ink with density $D_i$ (or thus the area with a transparency $T_i$); $A_{ij}$ is the area of the super-pixel covered with two different inks with densities $D_i$ and $D_j$ (or thus the area with transparencies $T_i$ and $T_j$); $A_{ijk}$ is the area of the super-pixel covered with three inks with densities $D_i$, $D_j$ and $D_k$ (or thus the area with transparencies $T_i$, $T_j$ and $T_k$); $A_{ijkl}$ is the area of the super-pixel covered with four inks with densities $D_i$, $D_j$, $D_k$ and $D_l$ (or thus the area with transparencies $T_i$, $T_j$, $T_k$, and $T_l$); and $A_{empty}$ is the area of the super-pixel that is not covered by ink at all. The total density is depending on the overlap of the individual pixels. A certain density is obtained by making the sum of all areas multiplied by the transparency, and by then making the average over the total area.

The surface of the super-pixel equals:

$$4d^2 = A_1 + A_2 + A_3 + A_4 + A_{12} + A_{13} + A_{14} + A_{23} + \quad \text{(eq. 20)}$$
$$A_{24} + A_{34} + A_{123} + A_{124} + A_{134} + A_{234} + A_{1234} + A_{empty}$$

Using eq. 19 and eq. 20, the density of a super-pixel can be calculated for every combination of dots within that super-pixel.

The results can be ordered, and the difference Δ between two succeeding values can be calculated. This difference Δ is, for example graphically, put in function of the density, and is then compared to the Kanamori curve. In this way, it is possible to determine the number of inks needed, as well as their density. By using the method of areas combined with different ink densities, best inks can be chosen to obtain a certain curve. This may be achieved by selecting ink densities and then using trial-and-error to obtain best results.

Figure 7:
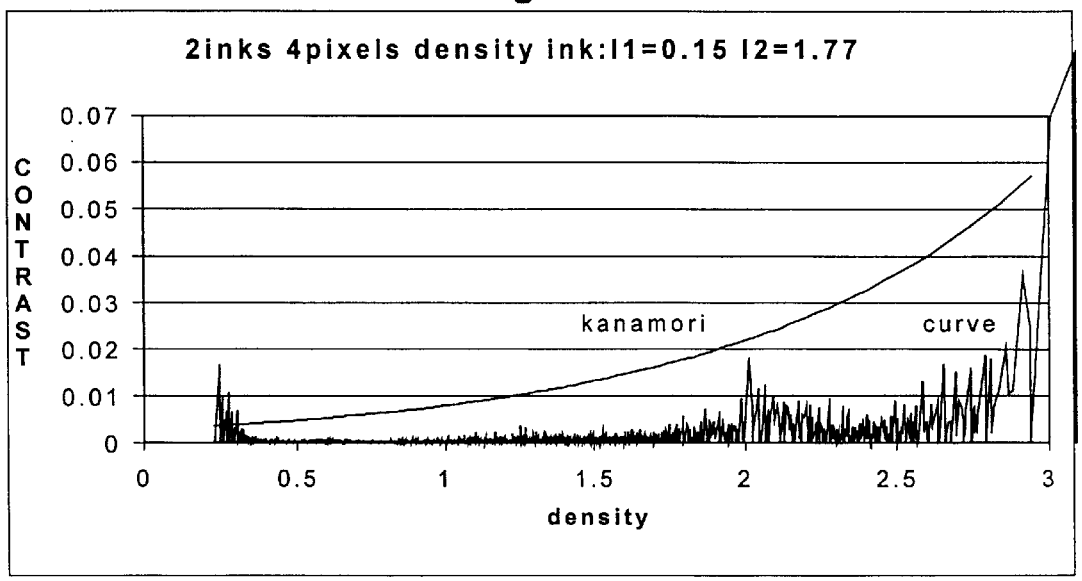
FIG. 7 shows a graph of contrast in function of densities of an example of a 2×2-matrix super-pixel, in which dots are printed with inks with two different densities.

FIG. 7 shows a graph of densities of an example of a 2×2-matrix super-pixel, in which dots with 8 different dot sizes are printed with two different inks, compared to the Kanamori curve. The density of the first ink is $I_1$=0.15 and the density of the second ink is $I_2$=1.77. The graph shows that it is possible to choose 256 values in such a way that the difference between two subsequent values is never so as to be above the Kanamori curve. This means that it is possible to make a continuous tone, so that no banding is seen in printed materials. If a graph would be obtained in which peaks peak out above the Kanamori curve, then no combination exists for which that density (of the peak) can be obtained.

The choice of the densities can furthermore be based on stability: if dots cannot be placed on the right locations (which may happen with ink jet heads), i.e. the dots are not perfectly aligned, then the overlap between individual dots shifts. This alters the grey level of the super-pixel. The density is calculated in such a case by calculating the density of two different rectangles as in FIGS. 6a and 6b, one with a side a little bit smaller than the side of the square, and one with a side a bit larger, where the smaller and larger side are taken with regard to the deviation of the location of the dots.

As the density will be smaller in the rectangle with the larger side, and higher in the rectangle with the smaller side, the mean density of two such rectangles, which are neighbouring, is only varying a little. It is possible to calculate this density for a certain misalignment of the dot placement. Thereafter, for example all densities which are out of range more than half the value of the Kanamori curve for a certain density may be rejected. Out of the remaining values, e.g. 256 grey values are chosen which are free of tolerance. This method can be used for dot-misalignment up to 4 μm.

The two different inks used have a different density. If different inks with more than two densities are used, those can be generated by mixing different concentrations of two inks, one of which has a high density and one of which has a low density.

Instead of two different inks, three or more different inks may be used. If e.g. three different inks are used, preferably a first ink has a very low density, a second ink has a medium density and a third ink has a higher density. For example, optical densities e.g. 0.03, 1.15 and 2.13 may be selected.

Figure 8:
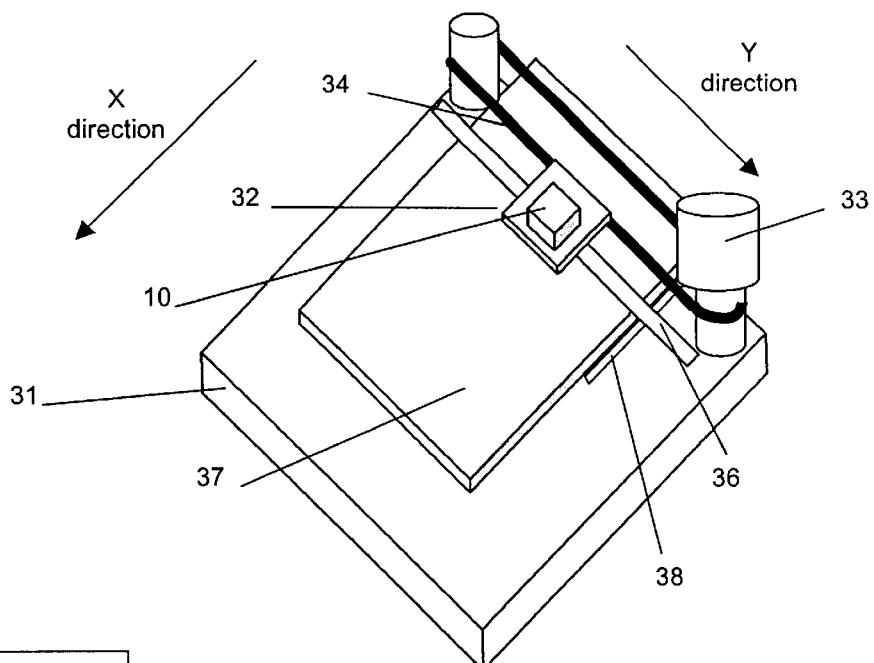
FIG. 8 is a highly schematic representation of a inkjet printer for use with the present invention.

FIG. 8 is a highly schematic general perspective view of an inkjet printer 20 which can be used with the present invention. The printer 20 includes a base 31, a carriage assembly 32, a step motor 33, a drive belt 34 driven by the step motor 33, and a guide rail assembly 36 for the carriage assembly 32. Mounted on the carriage assembly 32 is a print head 10 that has a plurality of nozzles. The print head 10 may also include one or more ink cartridges or any suitable ink supply system. The ink cartridges may comprise a set of at least two monochromatic ink containers which have different grey scale levels when printed. A sheet of paper 37 or other printing media, e.g. a transparency, is feed in the slow scan direction over a support 38 by a feed mechanism (not shown). The carriage assembly 32 is moved along the guide rail assembly 36 by the action of the drive belt 34 driven by the step motor 33 in the fast scanning direction.

Figure 9:
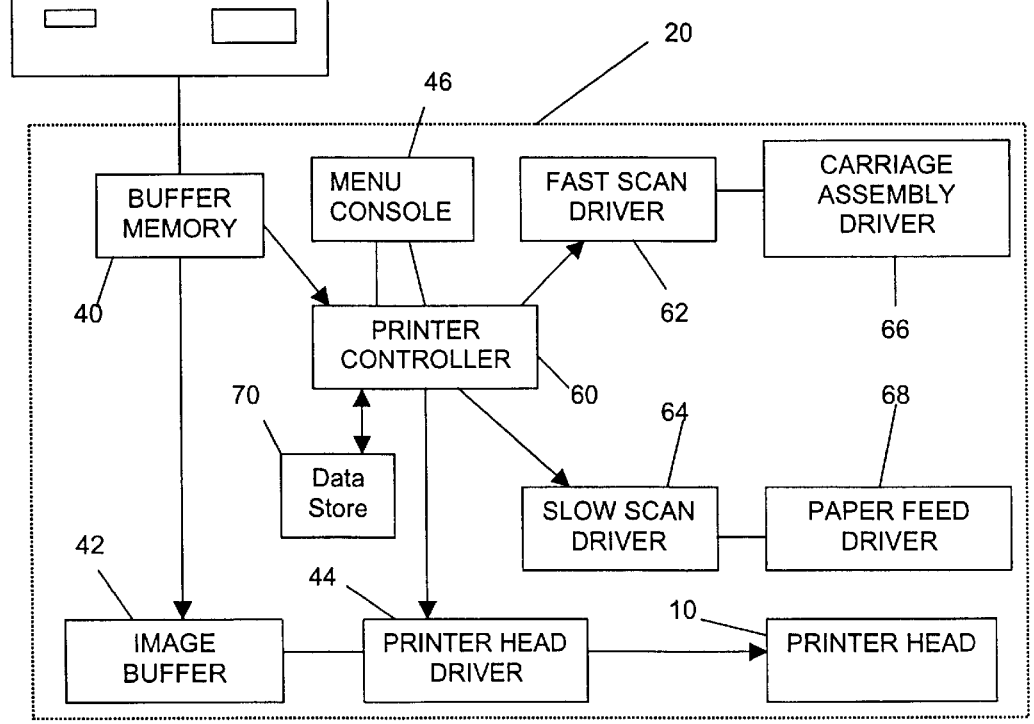
FIG. 9 is a schematic representation of a printer controller in accordance with an embodiment of the present invention.

FIG. 9 is a block diagram of the electronic control system of a printer 20, which is one example of a control system for use with a print head 10 in accordance with the present invention. The printer 20 includes a buffer memory 40 for receiving a print file in the form of signals from a host computer 30, an image buffer 42 for storing printing data, and a printer controller 60 that controls the overall operation of the printer 10. Connected to the printer controller 60 are a fast scan driver 62 for a carriage assembly drive motor 66, a slow scan driver 64 for a paper feed drive motor 68, and a head driver 44 for the print head 10. In addition there is a data store 70 for storing a look-up table or similar providing a concordance between a grey level to be printed and the number, size, optionally overlap (if not automatically given by dot size) and optionally ink type for each dot of a super-pixel to be printed. Host computer 30 may be any suitable programmable computing device such as personal computer with a Pentium III microprocessor supplied by Intel Corp. USA, for instance, with memory and a graphical interface such as Windows 98 as supplied by Microsoft Corp. USA. The printer controller 60 may include a computing device, e.g. microprocessor, for instance it may be a microcontroller. In particular, it may include a programmable printer controller, for instance a programmable digital logic element such as a Programmable Array Logic (PAL), a Programmable Logic Array, a Programmable Gate Array, especially a Field Programmable Gate Array (FPGA). The use of an FPGA allows subsequent programming of the printer device, e.g. by downloading the required settings of the FPGA.

The parameters to be stored in the data store 70 may be set into the data store 70 from host computer 30, e.g. by printer driver software running on the host computer 30. For example, a printer driver of the host computer 30 determines the various parameters that define the printing operations and transfers these to the printer controller 60 for writing into the data store 70. Based on these parameters, the printer controller 60 reads the required information contained in the printing data stored in the buffer memory 40 and sends control signals to the drivers 62, 64 and 44.

For instance, the printing data is broken down into the individual colour components to obtain image data in the form of a bit map for each colour component which is stored in the receive buffer memory 30. Each bit of the bit-map is associated with a grey level. In accordance with control signals from the printer controller 60, the head driver 44 reads out the colour component image data from the image buffer memory 52 to drive the array(s) of nozzles on the print head 10 to print the required super-pixels.

As indicated above the printer controller 60 may be programmable, e.g. it may include a microprocessor or an FPGA. In accordance with embodiments of the present invention a printer in accordance with the present invention may be programmed to provide different grey level printing complexities. For example, the basic model of the printer may provide selection of a first number of grey levels. An upgrade in the form of a program to download into the microprocessor or FPGA of the controller 60 may provide additional grey levels. Accordingly, the present invention includes a computer program product which provides the functionality of any of the methods according to the present invention when executed on a computing device. Furthermore, the present invention includes a data carrier such as a CD-ROM or a diskette which stores the computer product in a machine readable form and which executes at least one of the methods of the invention when executed on a computing device. The computing device may include one of a microprocessor and an FPGA.

The data store 70 may comprise any suitable device for storing digital data as known to the skilled person, e.g. a register or set of registers, a memory device such as RAM, EPROM, ROM or any solid state memory.

While the invention has been shown and described with reference to a preferred embodiment, it will be understood by those skilled in the art that various changes or modifications in form and detail may be made without departing from the scope of this invention. For instance, with reference to FIG. 9 the parameters for determining the data required for printing super-pixel grey levels is stored in data store 70. However, in accordance with the present invention the printing file to carry out the above mentioned printed embodiments may be prepared by the host computer 30 and the printer 20 simply prints in accordance with this file as a slave device of the host computer 30. Hence, the present invention includes that the printing schemes of the present invention are implemented in software on a host computer and printed on a printer which carries out the instructions from the host computer without amendment. Accordingly, the present invention includes a computer program product which provides the functionality of any of the methods according to the present invention when executed on a computing device which is associated with a printing head, that is the printing head and the programmable computing device may be included with the printer or the programmable device may be a computer or computer system, e.g. a Local Area Network connected to a printer. The printer may be a network printer. Further, the present invention includes a data carrier such as a CD-ROM or a diskette which stores the computer product in a machine readable form and which can execute at least one of the methods of the invention when the program stored on the data carrier is executed on a computing device. The computing device may include a personal computer or a work station.

What is claimed is:

1. A method of printing an image having super-pixels, each super-pixel comprising a combination of dots on a print medium, wherein the dots within at least one super-pixel are independently controlled with respect to:

1) a size of each dot, 2) a density of each dot, and 3) an at least part overlap of at least two of the dots.

2. A method according to claim 1, wherein each super-pixel is made up of a plurality of contiguous cells and at least one dot can be printed in each cell.

3. A method according to claim 1, wherein at least two inks with different grey levels are used.

4. A computer program product for executing the method as claimed in claim 1 when executed on a computing device associated with a printing head.

5. A machine readable data storage device storing the computer program product of claim 4.

6. A method of selecting a plurality of grey levels of super-pixels made of a combination of dots on a print medium, a grey level of a super-pixel being determined by the size of each dot, the density of each dot and an overlap of at least two of the dots within the super-pixel, wherein the selection is based on the Kanamori curve.

7. A method according to claim 6, wherein the selection is furthermore based on stability.

8. Use of the methods of claim 7 for obtaining grey levels for printing medical images.

9. An apparatus for printing an image having super-pixels, each super-pixel comprising a combination of dots to be printed on a print medium, the apparatus comprising means for independently controlling dots within a super-pixel with respect to:

1) a size of each dot, 2) a density of each dot, and 3) an at least part overlap of at least two of the dots.

10. An apparatus according to claim 9, wherein means for printing a dot with at least two inks with different grey levels are provided.

11. An apparatus according to claim 9, further comprising means for selecting the size of each dot, the density of each dot, and the overlap of at least two of the dots based on the Kanamori curve.

12. An apparatus according to claim 11, wherein the means for selection is furthermore adapted to select based on stability.

13. A printing medium comprising printed data, the printed data being represented by a plurality of super-pixels, each super-pixel comprising a plurality of printed dots, at least one printed super-pixel comprising two dot of different sizes, two dots of different densities and two dots which overlap each other partly.

14. A printing medium according to claim 13, wherein a super-pixel is made up of dots generated by at least two inks with different grey levels.

15. A printing medium according to claim 13, wherein a medical image is printed on the printing medium.

16. A control unit for use with a printing head for printing an image having super-pixels, each super-pixel comprising a combination of dots to be printed on a print medium, the control unit comprising means for independently controlling dots within a super-pixel printed by the printing head with respect to:

1) a size of each dot, 2) a density of each dot, and 3) an at least part overlap of at least two of the dots.

17. A control according to claim 16, wherein the control unit comprises means for controlling the printing head to print a dot with at least two inks with different grey levels.

18. A control unit according to the claim 16, further comprising means for controlling the selection the size of each dot, the density of each dot, and the overlap of at least two of the dots based on the Kanamori curve.

* * * * *